United States Patent
Samuelson et al.

(10) Patent No.: US 8,380,692 B2
(45) Date of Patent: Feb. 19, 2013

(54) FAST INDEX WITH SUPPLEMENTAL STORE

(75) Inventors: Mark A. Samuelson, Seattle, WA (US); Kevin B. Marshall, Kirkland, WA (US)

(73) Assignee: Nuance Communications, Inc., Burlington, MA (US)

( * ) Notice: Subject to any disclaimer, the term of this patent is extended or adjusted under 35 U.S.C. 154(b) by 106 days.

(21) Appl. No.: 12/019,999

(22) Filed: Jan. 25, 2008

(65) Prior Publication Data

US 2009/0192982 A1 Jul. 30, 2009

(51) Int. Cl.
*G06F 17/30* (2006.01)
(52) U.S. Cl. .................. 707/706; 707/736; 707/741
(58) Field of Classification Search .................. 707/741, 707/706, 736
See application file for complete search history.

(56) References Cited

U.S. PATENT DOCUMENTS

| | | | | |
|---|---|---|---|---|
| 5,515,305 A | * | 5/1996 | Register et al. | 708/145 |
| 5,799,184 A | * | 8/1998 | Fulton et al. | 1/1 |
| 2004/0267807 A1 | * | 12/2004 | Barabas et al. | 707/103 R |

* cited by examiner

*Primary Examiner* — Hung Q Pham
(74) *Attorney, Agent, or Firm* — Perkins Coie LLP

(57) ABSTRACT

A hardware and/or software search facility for searching and retrieving data stored on a mobile device. An index to the data is stored in fast memory (e.g., RAM) on the mobile device. The index contains a minimal amount of information necessary to present search results to a user. A supplemental data file is stored in storage that is local to or remote from the mobile device. The supplemental data files contain additional organized data that may be used to enhance the search results. In response to a search query, the facility uses the index to identify results that are responsive to the search query. The results are presented by the facility in accordance with predetermined rules. The facility may use the supplemental data file to perform further processing and present additional information. In some embodiments, the facility may mount or unmount indices and supplemental files from a device.

35 Claims, 8 Drawing Sheets

Internal Search Results

| Type | Name | Rank |
|------|------|------|
| C | John Z. | 12 |
| C | Margaret S. | 5 |
| C | Aaron B. | 30 |
| C | Shelly M. | 10 |
| M | Highway to the... | 500 |
| M | Brain Damage | 25 |
| M | Eclipse | 8 |
| B | Google.com | 2 |
| B | Zombo.com | 20 |

Where: C=Contact, M=Music, B=Bookmark

FAST INDEX WITH SUPPLEMENTAL STORE

BACKGROUND

Mobile devices are becoming increasingly prevalent. As the use of mobile devices becomes more common, enhanced features are being developed for these devices such as improved search functionality. Effective search technology allows device users to quickly and easily locate information contained on or accessible by the device. Indexing and searching information on mobile devices can be challenging, however, for a variety of reasons. For example, mobile devices may have limited memory capacity. In addition, mobile devices make use of removable memory cards and other data sources, which are not always accessible by the device. Furthermore, a user may desire to search many disparate types and sources of information at one time. Finally, mobile device users have come to expect search results to be delivered in real-time or near real-time. A system and method that facilitates searching multiple data types and sources that are stored on or accessible by mobile devices, while having reduced memory requirements and quick response time, would therefore be desirable.

DETAILED DESCRIPTION

Figure 1:
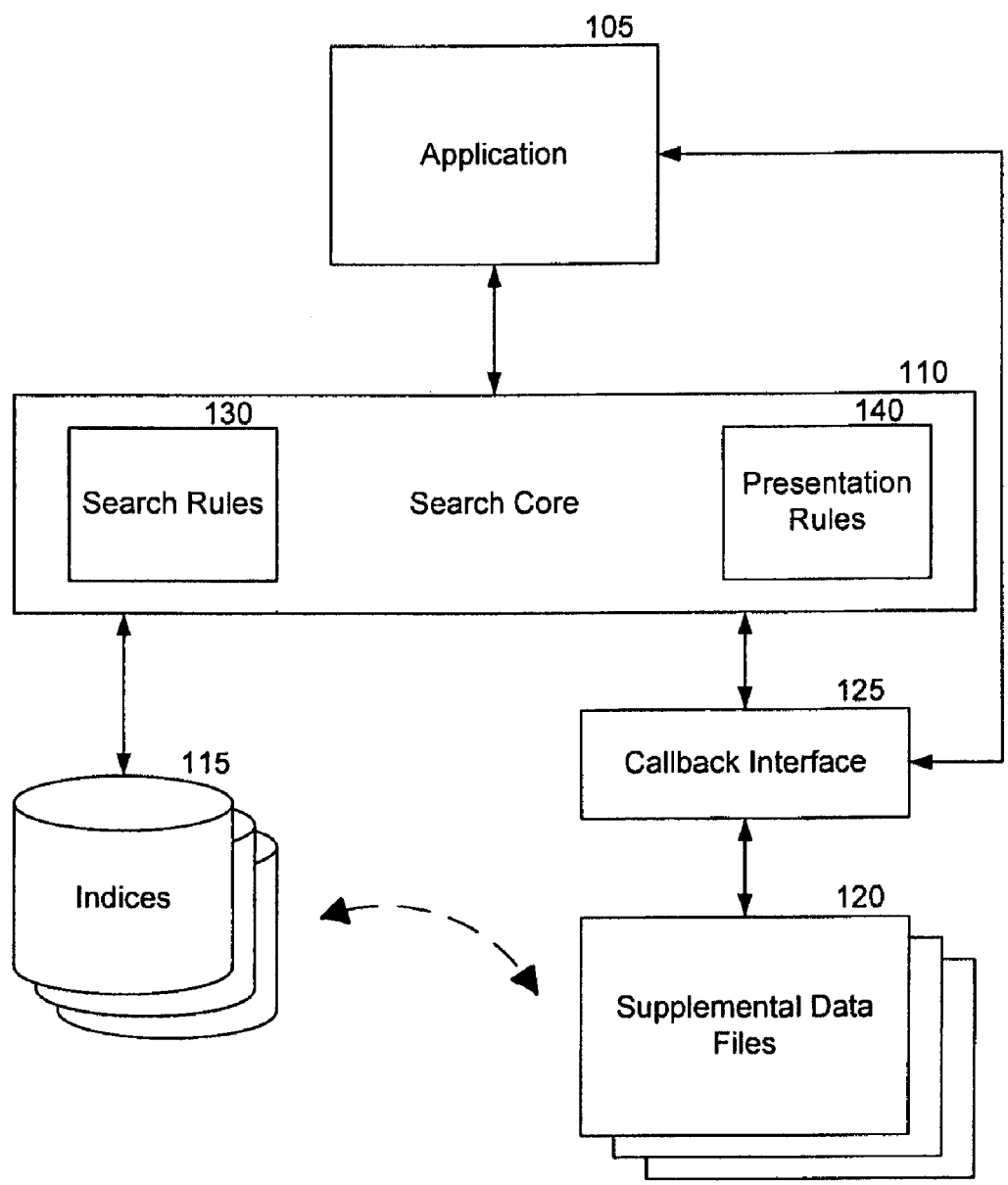
FIG. 1 is a block diagram illustrating various components contained in or coupled to a search facility in a mobile device.

A hardware and/or software search facility for searching and retrieving data stored on mobile devices, embedded devices, or any device having limited memory resources (hereinafter "mobile device" or "device") is described. An index or indices to the data are stored in fast memory (e.g., RAM) on the mobile device. The indices contain a minimal amount of information necessary to execute a search and present search results to a user. A supplemental data file or files are stored in storage (e.g., hard drive, flash memory) that is integral to, removable from, or remote from the mobile device. The supplemental data files contain additional organized data that may be used to enhance the search results. In response to a search query by an application or user, the facility uses the minimal index or indices to identify results that are responsive to the search query. The results are arranged by the search facility in accordance with predetermined rules and presented to the application or user. In certain circumstances, the search facility or the application uses the supplemental data file or files to perform further processing and present additional information to the user or application. Among other benefits, the search facility enables fast access to information sufficient to present search query results, while reducing the memory that needs to be allocated for storage and searching. Search results are provided to applications or displayed to device users, and applications or users may take actions associated with the search results.

In some embodiments, the facility may mount or unmount indices and supplemental data files from a device. Indices and files may be mounted and unmounted in order to optimize the available storage space on the device and/or to improve the processing capacity of the device. By mounting or unmounting indices, the facility permits searching of multiple data types and sources at the same time.

In some embodiments, the index may be constructed by the facility using an efficient encoding scheme. For example, if the facility is operating in a mobile device having a reduced keyboard, the index may be stored in an encoded form that corresponds to ambiguous strings entered by a user using the reduced keyboard. Constructing an encoded index increases the performance of the facility by enabling more efficient matching algorithms to be implemented.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram illustrating various components contained in the search facility or to which the facility connects in a mobile device. Data records to be searched are partitioned by a search core 110 into one or more minimal indices 115 and one or more supplemental data files 120. The minimal indices 115 are stored in a fast memory on the mobile device, such as random access memory (RAM). The indices 115 contain, at a minimum, the search data for a record as well as keys, handles or other links or pointers to additional data contained in the one or more supplemental data files 120. The minimal indices may be constructed by the search core, or mounted by the facility as described in additional detail herein. The facility is platform-independent, i.e., the facility is not dependent on external libraries, platform services, or dynamic memory routines, and the indexes are encoded in a byte-neutral fashion that is portable between different system architectures. The indices can be integrated with a variety of devices and applications, regardless of whether the device or application supports dynamic memory routines, and the indices may be easily moved from one device to another device. For example, a music catalog may be stored on a removable storage card and transferred from one device to another device.

The supplemental data files 120 are stored on an arbitrary storage medium, such as on a hard drive or in flash memory. The arbitrary storage medium typically has a greater access time than the indices stored in fast memory. The supplemental data files contain additional organized data that may be used to enhance the search results. New supplemental data files may be constructed by the search core, or preexisting supplemental data files may be mounted by the facility as described in additional detail herein. One of the benefits of partitioning data between minimal indices 115 and supplemental data files 120 is that trade-offs may be made by the facility between speed of results (achieved by accessing the indices in fast memory) and conservation of mobile device resources (achieved by moving data from fast RAM into slower, but higher capacity storage). A user of a facility may therefore tailor the performance of the search functionality to the constraints of a particular application or device.

The search core 110 may be utilized by any application 105 that needs access to search functionality. When the search core 110 receives a search query from an application 105, the query is applied against one or more of the indices 115. Which indices the query is applied against depends on search rules 130 that are applied by the search core. For example, the mobile device may contain different search indices for different types of content (e.g., different search indices for documents, messages, audio media, video media, etc.) that are stored on or accessible by the device. If a user is utilizing a music application on the mobile device, the user may want the search limited to audio media files. In such a case, the search core would only select the index or indices that relate to stored audio media files. The minimal indices typically include a minimum amount of information necessary to perform the search and quickly return the results to the application.

After the search query is applied against one or more of the indices 115, the search core 110 receives search results that are responsive to the query. The search results may be automatically prioritized by the search core by the application of presentation rules 140. Examples of presentation rules include ordering the results by frequency of use, alternating the order of results based on data types (e.g., $1^{st}$ contact result, $1^{st}$ music result, $1^{st}$ bookmark results, $2^{nd}$ contact result, $2^{nd}$ music result, $2^{nd}$ bookmark result, etc.), or a combination of both. An additional example of a presentation rule that may be automatically applied to search results is discussed herein with respect to FIGS. 8A and 8B. The search results are then returned to the application 105 for use or presentation to a user. If the search core only uses the indices 115 to generate the search results, the results may be quickly returned to the application as a result of the indices being stored in fast memory. In some circumstances, however, it may be desirable to include additional data as part of the search results, such greater textual descriptions, icons, graphics, etc. In these circumstances, the search core 110 or the application 105 may access the supplemental data files 120 to retrieve additional data.

The supplemental data files 120 are accessed by the search core 110 or the application 105 through a callback interface 125. The callback interface 125 is an interface that allows access to supplemental data files in a manner consistent with the local file system or memory management routine that is present on a mobile device. By utilizing a callback interface that can be tailored to the device, the search core may be implemented in a platform-independent fashion. As will be described in additional detail herein, entries in the index 115 contain a key, handle, or other pointer that links the index entry with a supplemental data file record. The search core 110 may therefore retrieve additional data associated with a search result and use the additional data to manipulate and/or enhance the search result. The use of additional data to present search results will inherently slow the performance of the application, however, as the supplemental data files are stored in slower storage media and greater time is needed to access the data contained in the files.

Figure 2:
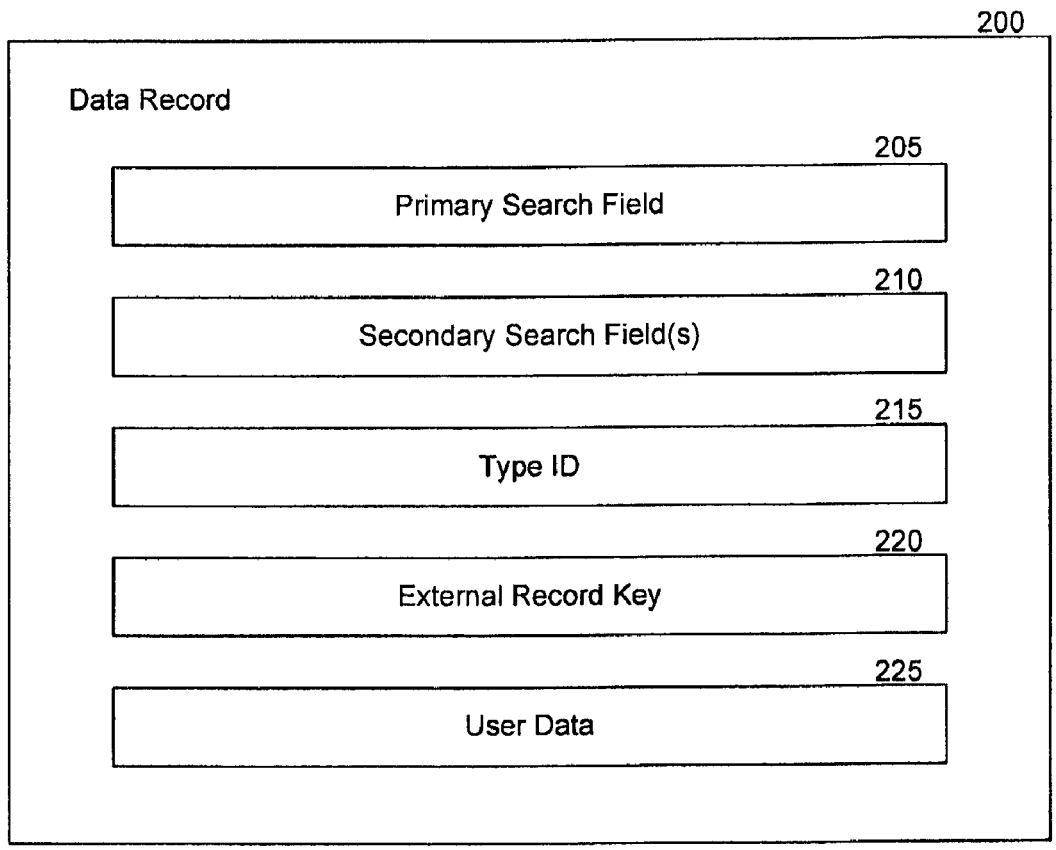
FIG. 2 is a block diagram illustrating a suitable record format that may be used by the facility to store data.

FIG. 2 is a block diagram illustrating the format of a data record 200 that is partitioned by the system and stored in the index and supplemental data file. The data record 200 comprises a primary search field 205, a type identification 215, and an external record key 220 or user data 225. A data record may also comprise one or more secondary search fields 210 associated with the search fields. Search fields, both primary 205 and secondary 210, comprise search terms or strings that are compared to the search query when searching is performed by the facility. For example, a primary search field 205 may correspond to a song title, while secondary search fields 210 may correspond to artist, album, genre, and other song information. As another example, a primary search field 205 may correspond to the name of an application, while secondary search fields 210 may correspond to synonyms for the application. In some embodiments, the facility searches all primary and secondary search fields during a search. In addition, the facility may search multiple fields when a user input sequence comprises multiple terms, permitting each of the terms to match against the same or different search fields. In some embodiments, search fields are classified according to one or more categories. The facility may use different matching logic (i.e., algorithms) to locate search results depending on the category of the search field. For example, a search field that is classified as a text string may be searched according to a different algorithm than a search field that is classified as a phone number. Similarly, different matching logics may be used to provide intuitive matching on languages that require significantly different matching rules. Search fields may originate from source text that is encoded in a variety of formats, including UTF-8, Latin-1 (via UTF-8), GSM 03.38, UCS2 and other formats. Those skilled in the art will appreciate that data record 200 is only a representative data record that may be partitioned by the facility, and that the facility may operate with other data records having a greater or lesser number of fields.

The facility may partition record data among indices and supplemental data files in a flexible manner. All record data 200 may be stored in an index 115, or some record data may be stored in a supplemental data file 120. Indices can be used for essential search data, while nonessential search data may be stored in a supplemental data file. Only the internal search structures need be stored in an index. All other record data may be stored in a supplemental data file. Those skilled in the art will appreciate that the partitioning can be based on the type of content, size of records, application, or other factor, and may be changed for each data record that is partitioned.

Multiple data types may be indexed by the facility. For example, different data types may be defined for phone numbers, music files, video files, bookmarks, applications, settings, and other types of information. The type identification 215 is therefore a code that identifies the type of data referenced by the data record. In some embodiments, the type identification is an 8-bit code that allows up to 255 data types to be defined and used by the facility. Depending on the particular application 105, the facility may use different partitioning strategies for different data types. That is, the facility may determine for each data type which record data will be stored in an index and which record data, if any, will be stored in a supplemental data file. For example, for a data type associated with software applications on a device, because of the typically limited number of applications the facility may determine that all record data is to be stored in an index, and no additional data stored in a supplemental data file. In contrast, for a data type associated with locations, the facility may determine that a city name is to be stored in the index and additional data, such as GPS coordinates for each location, is to be stored in a supplemental data file. Considerations relevant to partitioning strategies include latency in retrieving record data from a supplemental data file. For example, user data may be required by a user interface in order to display returned search results. If user data is stored in a supplemental data file, the time it takes to retrieve the user data from the supplemental data file should be considered in determining a partitioning strategy. The facility may provide one or more configuration options to an application 105 by which the application may customize its search functionality. For example, configuration options can assist an application in determining a partitioning strategy for each data type.

The external record key 220 is a reference to external data, such as files, applications, and other information that are linked with the data records. For example, external record key may contain a reference to a piece of stored music in the form of a file path, a URL, or other unique value that unambiguously references the piece of stored music. In addition to external data, the application developer may desire to have additional data considered responsive to search queries that match the data record. The user data 225 is therefore additional data added by the facility as being associated with the data record.

Figure 3:
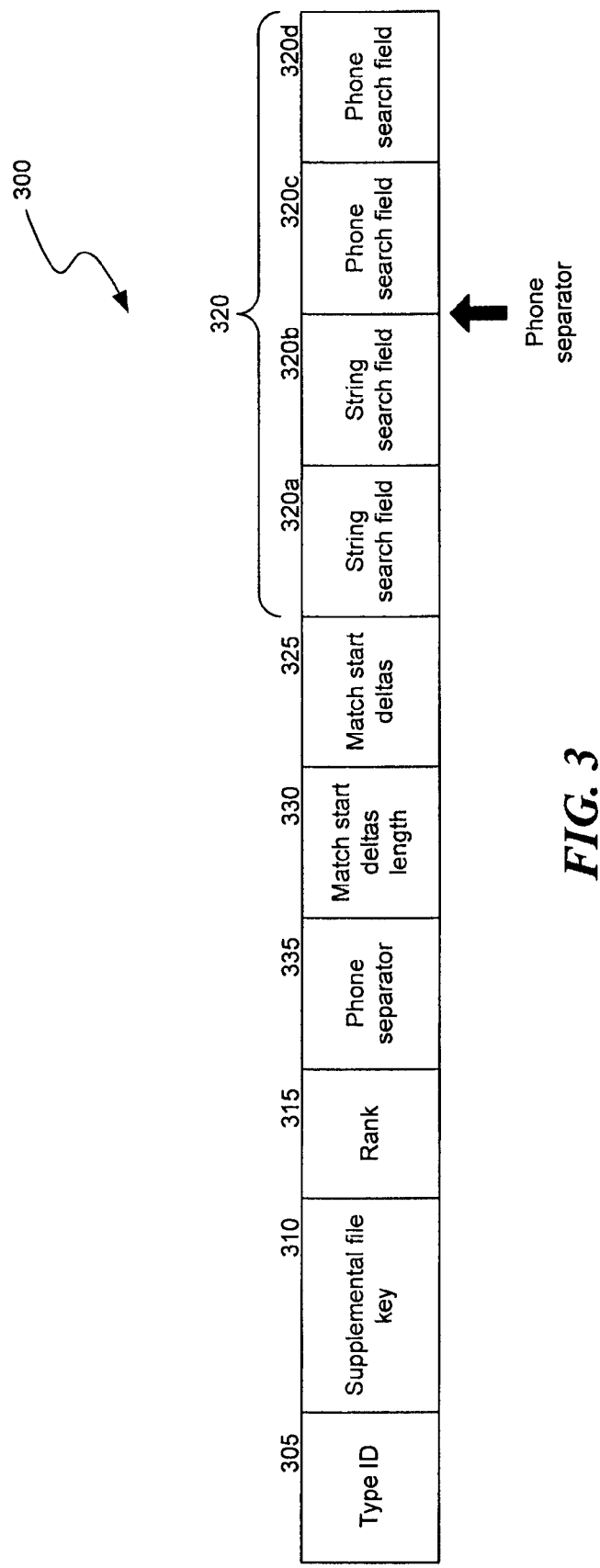
FIG. 3 is a block diagram of a minimal index entry that may be created by the facility when partitioning a data record.

The facility partitions the data contained in data records 200 between the one or more indices 115 and the one or more supplemental data files 120. FIG. 3 is an example of a minimal index entry 300 that may be created by the facility when partitioning the data record 200. The entry 300 contains a type ID 305 (corresponding to type ID 215) and a supplemental file key 310 that is a handle, key, or other indicator to the corresponding portion of the data record that has been partitioned for storage in the supplemental data files. The supplemental file key is interpreted by the facility to give the corresponding location of the data record in the supplemental data files.

The index entry further contains a search rank 315 associated with the associated data record. The search rank is a number or other code reflective of a global sorting order of the data record within its associated data type. For example, for a particular record the search rank may indicate that the record should be considered the second responsive result to a search query that matches the primary search field of the record. The search rank of a record may change over time, based on an algorithm used by the facility that takes into account the frequency of use of the record (e.g., search results that are selected less often will see their rank go down, whereas search results that are selected more frequently will see their rank go up). The search rank may be used by the presentation rules 140 to determine the ordering of search results. The presentation rules may utilize the search rank by itself, may apply various weighting factors to the search rank, or may combine the search rank with other data to arrive at the presentation order of the search results.

The index entry also contains one or more search fields 320, for example search fields corresponding to primary search field 205 and secondary search fields 210. In some embodiments, the search fields may be stored in unencoded form. In some embodiments, the search fields may be stored in encoded form. For example, the search fields may be stored as an ambiguous string of characters as if the search fields were generated by a user using a reduced keyboard. A search field might therefore contain the string "42779" which corresponds to the term "happy" when entered on a telephone keypad using a software application like T9® by Nuance Communications. Storing the index entry in encoded form allows the index to be more efficiently searched and minimizes the space necessary to store the index. If stored in unencoded form, the search fields may be directly used by the facility or application in the display of responsive search results. If stored in encoded form, the facility or application may opt to store one or more display strings in association with the data record for display purposes. The display strings may correspond to the unencoded representations of the search fields, and may be returned by the facility for display when search results are presented to the user. Such display strings may be stored in the index entry, but are more typically stored in the supplemental data files in order to conserve fast memory space.

The index entry 300 depicted in FIG. 3 is an index entry configuration that is particularly suitable for mobile phones or other mobile devices containing phone numbers. The index entry includes four search fields 320a, 320b, 320c and 320d. Search fields 320a and 320b comprise encoded strings of characters. Search fields 320c and 320d comprise encoded phone numbers that have been concatenated to remove spaces as well as punctuation (e.g., "+", "(",")"). To facilitate searching, match start deltas for each word in a search string are precomputed by the facility and stored in a compressed format in a match start deltas field 325. For example, if the text string stored in a search field was "What's a test string" the encoded form of the string would be "942817F2F8378F787464" (encoded based on the character/key combinations on a phone keypad) and the match start delta for that string would be 5 (for "What"), 2 (for "s[space]"), 2 (for "a[space]"), 5 (for "test[space]") and 6 for "string". Each match start delta therefore comprises the number of characters in a word plus the one or more spaces or punctuation marks necessary to reach the start of the next word. As another example, if the phone number stored in a search fields was "+1 (206) 555 1234" the encoded form would be "112065551234" and the match start delta would be 12 (for "112065551234"). All match starts deltas for all index entry search fields are stored by the facility in the match start deltas field 325 in a predetermined format. Since most match start deltas will not exceed 15 characters, the match start deltas can each be stored as a 4 bit value, with a special code used by the facility to handle cases where a match start delta exceeds 15 characters. Two additional fields are used in the depicted index entry 300 to facilitate use of the search fields. A match start delta length field 330 is used by the facility to indicate the length of the match start delta field 325 (and, by implication, the start of the search fields 320). A phone separator field 335 indicates the location of the start of the search fields 320 containing phone numbers. Other search fields indicative of other types of text or numbers (e.g., IP addresses) may, of course, be added to an index entry.

The minimal index entry 300 is only an example of an index entry that may be constructed by the system, and those skilled in the art will appreciate that other index entries having a greater or lesser number of elements may be used by the facility. In some embodiments, the index entries are sorted by rank order and the index is updated any time the rank of a data record is increased or decreased. Rank ordering the index improves linear searches of the index and does not unduly impact performance if the rank of data records changes infrequently.

An advantage of data partitioning by the facility is that it results in a very memory efficient representation of search results that may be re-used as required by the facility. When a search query matches one or more index entries 300, the information contained in the index entry allows the facility to quickly provide an indication of the results of the search. The facility can then make one or more additional fetches from the supplemental data file to retrieve additional detail about the search results, such fetches being made on an as-needed basis to use or display the search results. For example, an application or user may submit a search query that returns a large number (e.g., 73) of search results. If the screen size of a mobile device only allows ten results to be displayed at a time, the facility only needs to fetch information from the supplemental data files pertaining to the first ten search results. Then, as a user or application scrolls to or otherwise selects additional search results, the facility may reuse the initial search results to fetch information from the supplemental data files pertaining to the selected additional results. By accessing the index only once and postponing accesses to the supplemental data files until absolutely necessary, the facility conserves overall device resources.

Figure 4A:
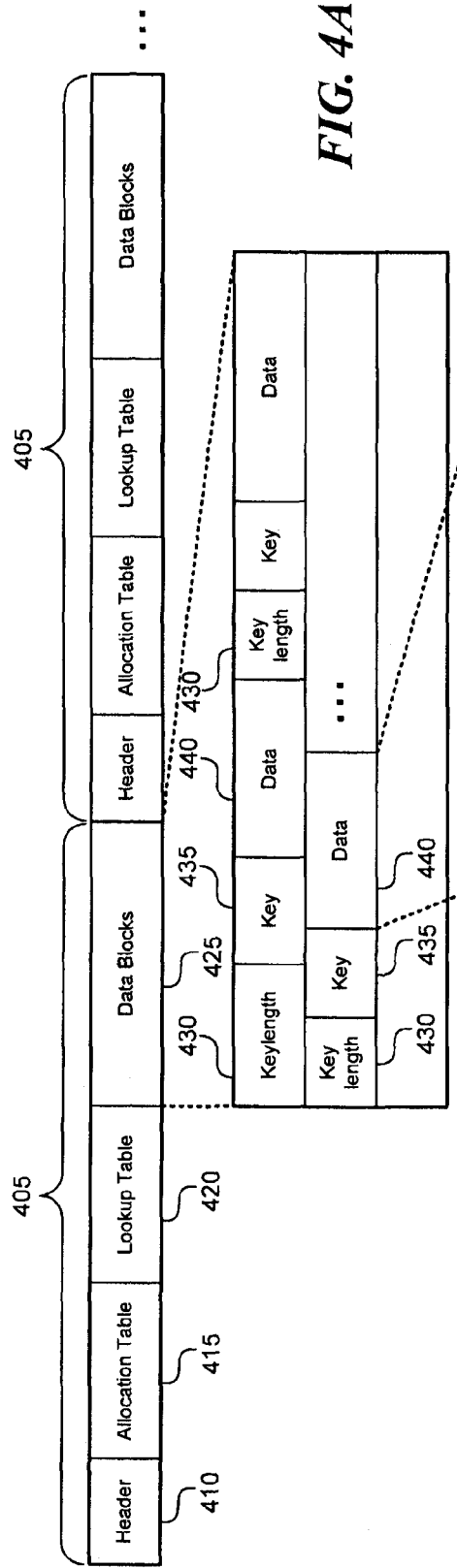
FIGS. 4A and 4B are block diagrams of a supplemental data file format.

FIG. 4A is a block diagram of a supplemental data file format. The supplemental data is divided into one or more segments 405. Each segment shares a common format, including a header 410, an allocation table 415, a lookup table 420, and a data block section 425. An abstracted view of the data block section 425 is provided to depict the type of data stored in the section. An optional keylength field 430 contains a code representative of the size of an optional key used by the facility to translate a key to a supplemental file address. The keylength field is followed by an external record key 435 and data 440 associated with each key, each combination of keylength field, external record key, and data corresponding to one data record. The external record key 435 corresponds to the external record key 220 as depicted in FIG. 2. External record key 435 is uniquely associated with a stored file or other data and may be used by the facility or by an application to locate that file or data. The data 440 includes user data 450, display string data 445, and/or any other data that was partitioned by the facility from each data record and stored in the supplemental data files. Two length values are provided to specify the size of the display string and the user data portions of the data. The length values may be used to retrieve the stored display string and user data portions, as well as to determine the starting memory locations of other data portions that follow the display string and the user data portions. A display string length 455 is provided to specify the size of the display string that is stored immediately following the stored user data. A user data length 465 is provided to specify the size of the stored user data (corresponding to user data 225). Using the display string length and the user data length, the facility may retrieve the display string data and user data. A display string match logic field 460 contains the particular logic used to decode the display strings data 445. The facility is able to retrieve the appropriate record data by using the supplemental file key identified in the fast index search to locate the corresponding data in the data block sections of the supplemental data files.

Figure 4B:
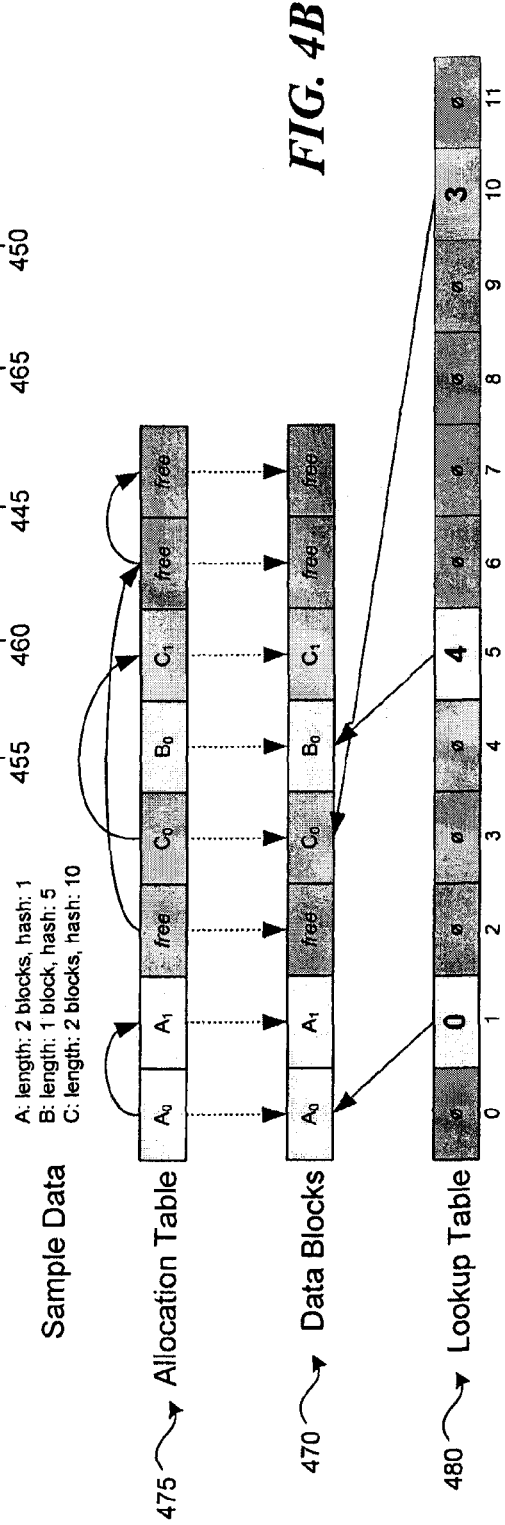

The facility stores the data in the data block section 425 in fixed size, noncontiguous blocks. The facility selects the block size based on the particular application and size of data being stored in the supplemental data files. Stored data that exceeds the size of one block may extend to additional blocks that are linked by pointers in the allocation table 475. The size of the equal-sized blocks is preferably optimized, however, to minimize the required number of additional blocks while at the same time keeping the internal fragmentation penalty at acceptably small levels. The allocation table 415 connects the fragmented data blocks and free space in the data block section with linked lists. While the allocation table is depicted as being stored adjacent the header portion of segments 405, it will be appreciated that the allocation table may be stored in the data block section 425 instead. A representative example of the construction of the data block section and operation of the allocation table is depicted in FIG. 4B. Three pieces of sample data are depicted as being stored in data blocks 470: sample data A, having a length of two blocks and a hash value of 1; sample data B, having a length of one block and a hash value of 5; and sample data C, having a length of two blocks and a hash value of 10. Each of the sample blocks of data is stored in one of the data blocks 470, although not always in a contiguous fashion. For example, sample data C is split between two data blocks $C_0$ and $C_1$ that are separated by a data block containing sample data B. A representative allocation table 475 is depicted as storing a series of pointers that link each of the blocks. For example, the allocation table stores a pointer that links data block $C_1$ to data block $C_0$. By accessing the allocation table, the facility can therefore recover the entirety of sample data C. In a similar fashion, the allocation table contains a single chain of all free data blocks that are available to receive data in the data blocks section. New data that is added to the data blocks may be stored in the initial free block and any subsequent linked blocks noted in the allocation table. The starting pointer to the chain of free blocks is then advanced to remove the newly-stored blocks. In this fashion, data may be easily added to the data blocks 425 in the supplemental data store.

The lookup table 420 maps hash keys to particular data blocks. A representative lookup table 480 is depicted in FIG. 4B for the sample data A, B, and C. In this example, the lookup table is implemented as an open-addressed hashtable. The hash value of the external record key directs the facility to the initial lookup entry that is associated with that key. For example, the hash value of sample data B is "5," and the lookup table entry for a hash value of "5" directs the facility to the fourth data block in the set of data blocks 470. In cases of hash collisions, the algorithm will probe the next entry in the hash table until a matching key is found, or until all possibilities are exhausted. It will be appreciated that the lookup table 420 is a time-efficient alternative to performing a linear search for the external record key in order to find a data record in the supplemental data files. The existence of the lookup table provides additional functionality by enabling the facility or application to insert a record (i.e., checking if the external record key already exists), update a record (finding an existing data record using a matching key), or delete a record (finding an existing data record using a matching key).

The facility selects the size of a segment 405 when the supplemental data files are initially configured. When the supplemental file runs to capacity, it can be enlarged by expanding the file on the platform, then filling the remainder of the newly-grown file with additional segments.

It will be appreciated that the facility does not always need to access the supplemental data files 120 when providing results to search queries. The supplemental data files are only accessed when additional data contained in the supplemental data files is required for further search results processing or display. For example, the facility may store data in an index corresponding to names of software applications available on a mobile device. A supplemental data file may store an icon, or a reference to an icon, associated with each application. If a search performed by the facility returns several dozen matches, but only three results may be displayed at one time on a device screen, only three icons initially need to be retrieved from the supplemental data file. Thus, only three accesses of the supplemental data file are required.

It will also be appreciated that there does not need to be a one-to-one relationship between index 115 and a supplemental data file 120. Several indices may use the same supplemental data file, and one index may use several supplemental data files. A supplemental data file must be mounted, however, before any of the indices associated with the supplemental data file are mounted into memory.

Indices and supplemental data files are dynamic. Certain data on a mobile device may be added, updated, deleted, or otherwise modified by a device user. The facility adds, updates, and deletes the data records that correspond to the added, modified, or deleted data.

Before data may be indexed or searched, the facility initializes the search core 110 and establishes data structures. If the search core is being initialized for the first time, the facility may create new indices 115 and/or supplemental data files 120. At the time of creating a new index, the facility may allow an application 105 to determine the format of the data record and specify how data records will be partitioned. For example, the application may be able to specify the length of each display string. If indices and/or supplemental data files have previously been created and persisted, these indices and/or supplemental data files may be restored back into memory and mounted.

Figure 5:
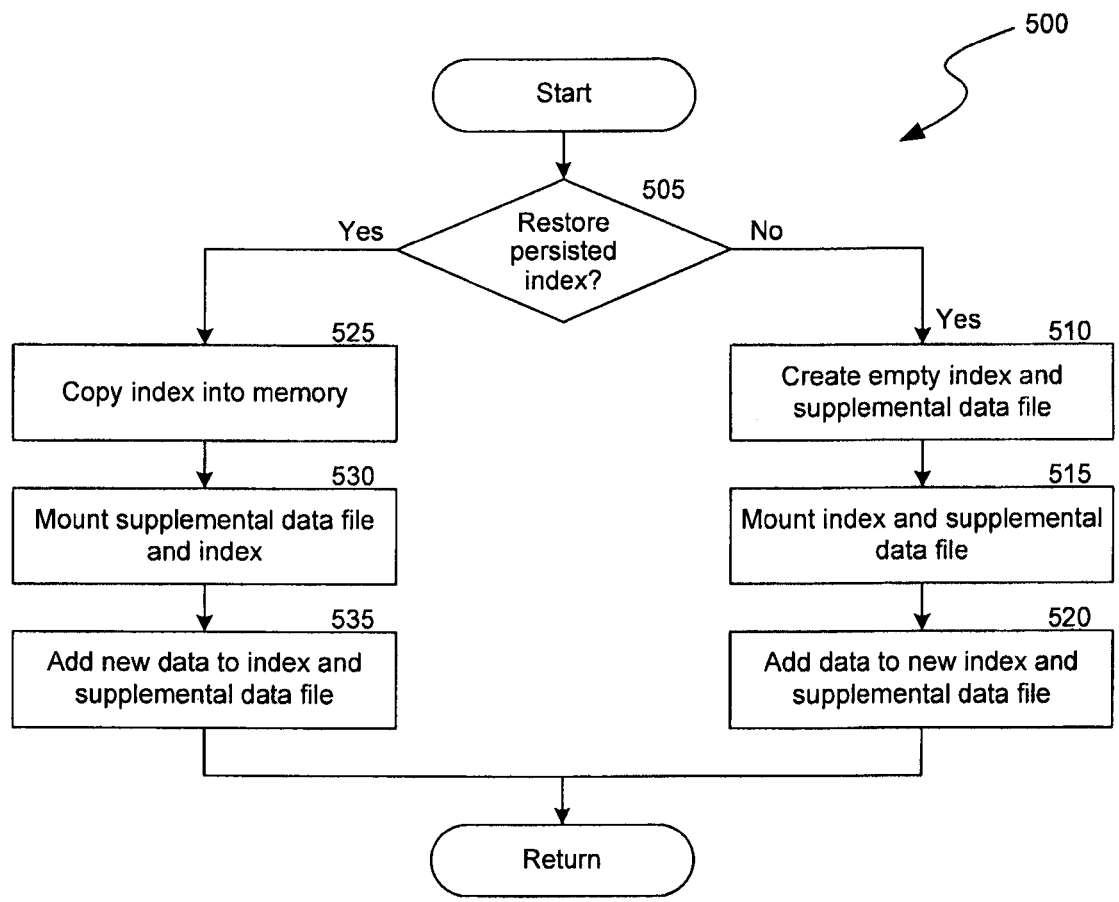
FIG. 5 is a flow diagram of a process by which the facility may initialize a search core.

FIG. 5 is a flow diagram, of a process 500 by which the facility may initialize the search core. At a decision block 505, the facility determines whether a new index and supplemental data file is to be created, or whether a persisted (i.e. previously stored) index and supplemental data file is to be restored. For example, a new index and supplemental data file may be created if the search core is being initialized for the first time (i.e., if a persisted index is not available). If a new index and supplemental data file is to be created, at a block 510 the facility creates an empty index and supplemental data file. At a block 515 the facility mounts the index and the supplemental data file. At a block 520 the facility adds record data to the newly created index and supplemental data file. The record data is partitioned between the index and the supplemental data file in the manner previously described herein.

If at decision block 505 the facility instead determines that a previously-persisted index and supplemental data file is to be restored, processing continues at a block 525. An application can persist an index between mounts, that is, the index may not be actively used but may be stored locally on or remotely to the mobile device. At block 525, the previously-persisted index is copied into RAM. At a block 530, the facility mounts the previously-persisted index and supplemental data file. The supplemental data file is preferably mounted into memory by the facility before the index that is associated with the supplemental data file is mounted into memory. The mounting of the supplemental data file before the index prevents an error condition in which the index is used in a manner that returns a reference to a non-accessible supplemental data file. Once the facility mounts the indices and supplemental data files into memory, at a block 535 the facility may add new data to the index and supplemental data file. For example, if an index has been restored from persistence, there may be new data that needs to be added to the index since it was persisted.

The facility supports searches over multiple indices. The search core can mount multiple indices at a given time, and a search may be conducted across all mounted indices. The steps disclosed in blocks 525-535 may therefore be repeated to mount additional indices and supplemental data files.

An application may dynamically load and unload indices between searches. For example, an application may manage removable media, such as a memory card, by dynamically mounting and unmounting indices associated with data stored on the removable media. Indices are mounted when the removable media is present, and indices are unmounted when the removable media is removed from a mobile device. The ability to dynamically load and unload indices gives the application the flexibility to handle varying environments and provide additional capabilities. For example, an application may handle a low memory situation by unmounting unnecessary indices in order to free up device memory. An application may also isolate transient data (e.g., music on a memory card that may be inserted into or removed from the device) from resident data (e.g., contact listings stored in device memory). In addition, an application may share and combine indices between different applications. For example, a song index used in one application may be combined with artist and album indices and used in a second application. To facilitate this capability, the index memory is fully contained within a contiguous array of memory. This format allows indices to be easily persisted from memory without the need for specialized serialization routines.

Figure 6:
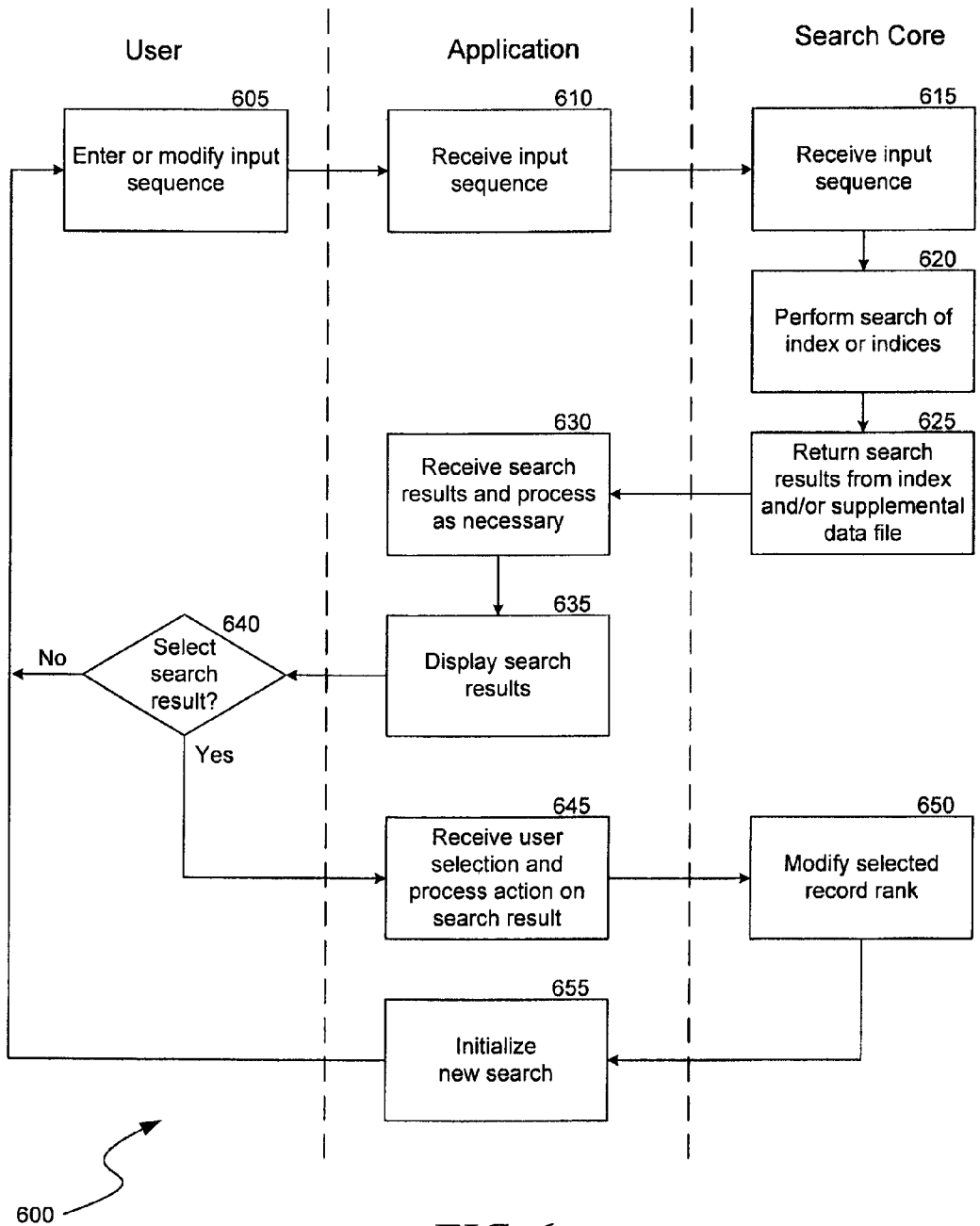
FIG. 6 is a flow diagram of a process by which a user may interact with the facility to obtain search results.

Once indices and supplemental data files have been mounted for search by the facility, the facility may receive an input sequence from a mobile device user. The facility matches the input sequence against the indices and returns search results to the user. FIG. 6 is a flow diagram of a process 600 by which a user may interact with the facility. At a block 605, the user enters an input sequence (i.e., a search query). An input sequence may comprise key strokes, voice input, and other types of input. A single input sequence may comprise more than one type of input. For example, an input sequence may combine both voice and text input (e.g., key strokes). In some examples, the input sequence received from the user is ambiguous. That is, a single key press by the user may map to multiple characters.

At a block 610, the application receives the user's input sequence and passes it to the search core. At a block 615, the search core receives the input sequence. At a block 620 the search core performs a search, matching the input sequence to record data in the mounted indices and supplemental data stores, as described above. The matching algorithm used by the search core may include linear search, trie search, weighted trie search, tree, graph or other search algorithm to identify results that are responsive to the search. Specialized matching algorithms may also be used by the facility. For example, the facility may implement a restricted match algorithm and/or an unrestricted match algorithm depending on the type of search being performed. In the restricted match algorithm, a query string is compared with search fields starting at the beginning of the search fields. The restricted match algorithm will therefore only identify initial character matches. In the unrestricted match algorithm, a query string is compared with all portions of the search fields, thereby identifying intra-string matches. An example application using restricted and unrestricted matching algorithms is a phone number search. If a user is searching for a phone number such as "2063591212" but does so by entering the string "359" (omitting the area code), the facility may initially use the restricted match algorithm to identify matching phone numbers. When the third digit is received, or if no results are being returned by the restricted match algorithm, the facility may then use the unrestricted matching alogorithm to match the received string against phone numbers that are contained in the user's contact list. The use of the unrestricted matching algorithm would therefore identify the intra-string match and return "2063591212."

At a block 625, the search core returns to the application search results from the mounted indices and supplemental data files. In some examples, search results are returned in a two-step process. In the first step, records in the indices that match the user input sequence are returned as supplemental file keys. These supplemental file keys are used by the facility to uniquely identify the located matching records in the supplemental data files and to obtain an external reference key that may be used by the application to access the data records directly via the callback interface. At a block 630, the application receives the search results from the search core, and at a block 635 the application displays the received search results to the user.

Once the search results are displayed, the user may select a search result or modify the input sequence. At a decision block 640, the facility determines whether the user has selected a displayed search result. If the user has selected a search result, at a block 645 the application receives the user selection, executes the action associated with the user selection (e.g., if a user selects a contact from an address book, the application may display a listing of information associated with the contact), and passes the selection to the search core. At a block 650, the search core modifies the rank of the record associated with the user selection, so that the selected record may appear higher in the result lists of future searches.

Once the search core has modify the rank of the selected record, at a block 655 the application may initialize a new search. To initialize a new search, the application may reset the input sequence, clear the search results display, and await another user input sequence. The process returns to block 605 where the user may enter a new input sequence.

If at decision block 640 the user did not select a search result, the process may return to block 605, where the user may modify the input sequence. For example, the user's initial input sequence may have comprised two characters. A search conducted against this input sequence may not have returned desirable search results to the user. The user may add additional characters to the input sequence in order to locate more desirable results.

Figure 7:
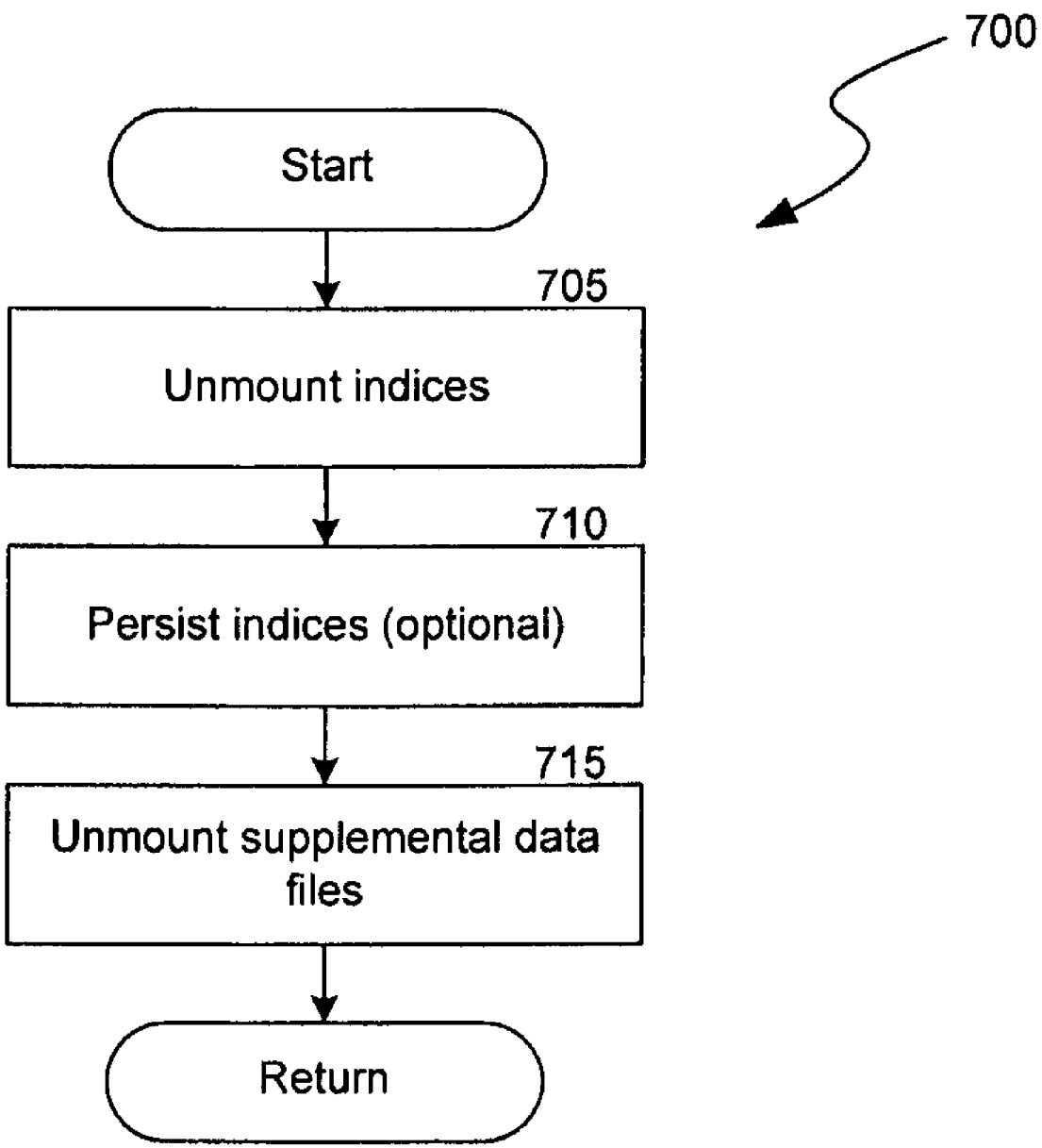
FIG. 7 is a flow diagram of a process by which indices and supplemental data files may be unmounted by the facility.

When an index or supplemental data file is to be removed from the facility, it must be unmounted from memory. FIG. 7 is a flow diagram of a process 700 by which indices and supplemental data files may be unmounted by the facility. At a block 705, the facility unmounts the indices used for search. Once an index (or supplemental data file) has been unmounted, it cannot be searched against or modified by the facility. At a block 710, the facility may optionally persist the unmounted indices, such as in a hard drive or removable storage. An application may persist an index (or a supplemental data store) after it is unmounted so that the index may be subsequently used in the future. At a block 715, the facility unmounts the supplemental data files used for search. The application may then close the supplemental data files.

It will be appreciated that various modifications may be made to the facility. For example, while a partitioning of data records into indices stored in fast memory and supplemental data files stored in slower storage was discussed above, it will be appreciated that the fast memory and slower storage may be used in a variety of ways. For example, a supplemental data file may be built in fast memory to enable it to be constructed quickly, then pushed to a supplemental data file when construction is complete. Storing the index as a whole minimizes the number of data transfers that need to be performed with the slower storage. As another example, a supplemental data file may be temporarily copied or moved into fast memory to improve performance for short periods, then copied or moved back into slower storage when such performance is no longer necessary. Other hybrid solutions that use fast memory and slower storage to store an index and supplemental data may be envisioned.

Figures 8A, 8B:
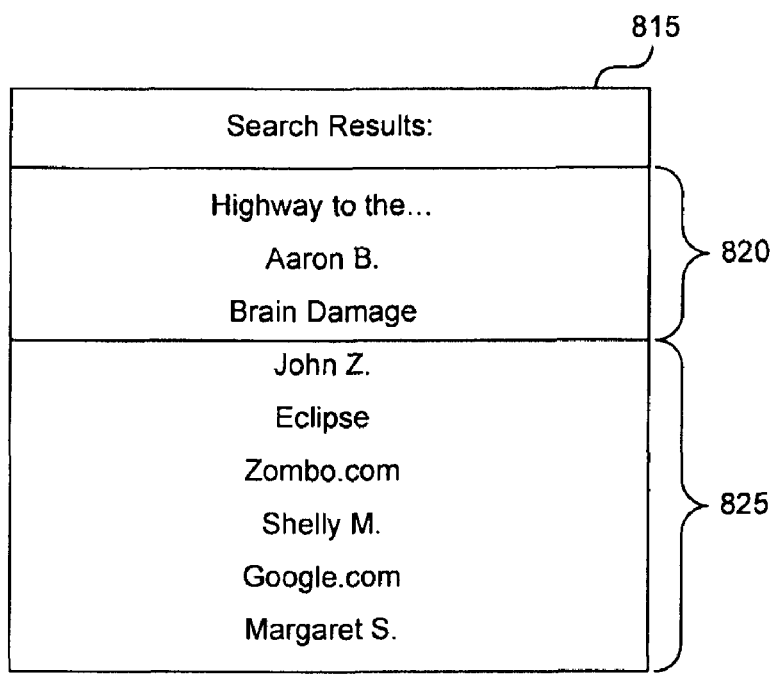
FIGS. 8A and 8B are block diagrams of a representative user interface depicting an ordering of search results by the facility in accordance with a presentation rule.

As another example of a modification that may be made to the facility, other presentation rules may be utilized by the facility to automatically order search results. FIGS. 8A and 8B depict the operation of a presentation rule that takes into account both data record type and data record rank when ordering search results. FIG. 8A is a representative list 800 of search results that are returned in response to a search query. The list includes three types 805 of data records, namely contacts (C), music records (M), and bookmarks (B). Each search result has an associated rank 810 that reflects the estimated relevance of the search result to the search query. In the depicted example, the higher the rank, the greater the relevance. FIG. 8B is a representative user interface 815 that depicts the ordering of search results according to a presentation rule that takes into account both data record type and data record rank. A top section 820 of the search results presents the most relevant results, regardless of data record type. For example, the top section 820 in FIG. 8B shows the top three search results having the highest overall rank. A bottom section 825 of the search results presents some or all of the remaining results by alternating search result by record type and presenting the highest remaining ranked search result of that record type. For example, the bottom section 825 in FIG. 8B alternates between contact, music, and bookmark (i.e., C, M, B, C, M, B) and presents the highest ranking data record of that record type that hasn't already been presented in the top portion 820. Those skilled in the art will appreciate that a greater or lesser number of search results may be displayed in each section, and that other ordering methodologies for each section may be used by the facility.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method of storing data records in a mobile device and retrieving data records that are responsive to a search query, the method comprising:
   storing a plurality of data records by:
      storing in a supplemental file a portion of each of the plurality of data records, the supplemental file being resident in a storage component of the mobile device having a first access time; and
      storing in an index a plurality of index entries, each of the plurality of index entries comprising one or more search fields that are associated with a data record, a portion of the data record, and a reference to a corresponding portion of the data record stored in the supplemental file, the index being resident in a memory of the mobile device, wherein the memory of the mobile device has a second access time that is shorter than the first access time for the storage component of the mobile device;
   receiving a search query from a user;
   retrieving one or more index entries that are responsive to the search query by:
      comparing the search query with at least some of the plurality of index entries to identify the one or more index entries having one or more search fields that are responsive to the search query; and
      retrieving portions of data records associated with the identified one or more index entries from the index;
   presenting at least some of the retrieved portions of data records to the user as being responsive to the search query; and
   in response to receiving a selection of one of the presented portions of data records:
      retrieving an additional portion of the selected data record from the supplemental file, and
      presenting the retrieved additional data portion to the user.

2. The method of claim 1, wherein the portions of data records are retrieved from the index and the supplemental file.

3. The method of claim 2, wherein the portions of data records are retrieved from the index once and retrieved from the supplemental file a plurality of times.

4. The method of claim 1, wherein the portion of a data record stored in the index is smaller than the portion of the data record stored in the supplemental file.

5. The method of claim 1, wherein the reference to a corresponding portion of the data record stored in the data file is a handle.

6. The method of claim 1, wherein the storage component is a hard drive.

7. The method of claim 1, wherein the storage component is flash memory.

8. The method of claim 1, wherein the memory is random access memory.

9. The method of claim 1, further comprising automatically ordering the retrieved portions of data records according to one or more presentation rules, and wherein the retrieved portions of data records are presented in the order determined by one or more presentation rules.

10. A system for storing data records in a mobile device and retrieving data records that are responsive to a search query, the system comprising:
   a supplemental file configured to contain a plurality of supplemental entries, each of the supplemental entries comprising a portion of a data record, the supplemental file being resident in a storage component having an access time and that is associated with the mobile device;
   an index configured to contain a plurality of index entries, each of the plurality of index entries comprising one or more search fields that are associated with a data record, a portion of a data record, and a reference to a corresponding portion of the data record stored in the supplemental file, the index being resident in a memory of the mobile device, wherein the memory of the mobile device has an access time that is shorter than the access time for the storage component of the mobile device;
   an input component for receiving a search query from a user;
   a search core component for partitioning a plurality of data records, between an index entry stored in the memory of the mobile device and a supplemental entry stored in the storage component;
   a retrieval component for retrieving one or more index entries that are responsive to the search query by:
      comparing the search query with at least some of the plurality of index entries stored in the memory of the mobile device to identify the one or more index entries having one or more search fields that are responsive to the search query; and
      retrieving portions of data records associated with the identified one or more index entries from the index;
   a display component for presenting at least some of the retrieved portions of data records to the user as being responsive to the search query; and
   a second retrieval component for receiving a selection of one of the presented portions of data records, and, in response to receiving a selection of one of the presented portions of data records:
      retrieving an additional portion of the selected data record from the supplemental file, and
      presenting the retrieved additional data portion to the user.

11. The system of claim 10, wherein the portions of data records are retrieved from the index and the supplemental file.

12. The system of claim 11, wherein the portions of data records are retrieved from the index once and retrieved from the supplemental file a plurality of times.

13. The system of claim 10, wherein the portion of a data record stored in the index is smaller than the portion of the data record stored in the supplemental file.

14. The system of claim 10, wherein the storage component is located remote from the mobile device.

15. The system of claim 10, wherein the reference to a corresponding portion of the data record stored in the data file is a handle.

16. The system of claim 10, wherein the storage component is a hard drive.

17. The system of claim 10, wherein the storage component is flash memory.

18. The system of claim 10, wherein the memory is random access memory.

19. The system of claim 10, further comprising automatically ordering the retrieved portions of data records according to one or more presentation rules, and wherein the retrieved portions of data records are presented in the order determined by one or more presentation rules.

20. A method of retrieving data records that are responsive to a search query in a mobile device, the method comprising:
   receiving a search query from a user;
   comparing the search query with a plurality of index entries to identify one or more index entries that are responsive to the search query, each index entry comprised of one or more search fields that are associated with a data record, a portion of the data record, and a reference to a corresponding portion of the data record being resident in a supplemental file that is stored in a storage component having a first access time, the plurality of index entries being resident in a memory of the mobile device, wherein the memory of the mobile device has a second access time that is shorter than the first access time for the storage component of the mobile device;
   retrieving portions of data records from the identified one or more index entries;
   presenting one or more portions of the data records from the identified one or more index entries as a search result; and
   in response to receiving a selection of one of the presented portions of data records:
      retrieving corresponding portions of data records associated with the identified one or more index entries from the supplemental file, the supplemental file being resident in the storage component of the mobile device; and
      presenting at least some of the retrieved portions of data records to the user as being responsive to the search query.

21. The method of claim 20, wherein the portion of a data record stored in an index entry is smaller than the corresponding portion of the data record stored in the supplemental file.

22. The method of claim 20, wherein the one or more index entries that are responsive to the search query are identified once, and the corresponding portions of data records associated with the identified one or more index entries are retrieved from the supplemental file a plurality of times.

23. The method of claim 20, wherein the storage component is a hard drive.

24. The method of claim 20, wherein the storage component is flash memory.

25. The method of claim 20, wherein the memory is random access memory.

26. The method of claim 20, further comprising automatically ordering the retrieved portions of data records according to one or more presentation rules, and wherein the retrieved portions of data records are presented in an order determined by one or more presentation rules.

27. A system in a mobile device for retrieving data records that are responsive to a search query, the system comprising:
- a supplemental file containing a plurality of supplemental entries, each of the supplemental entries comprising a portion of a data record, the supplemental file being resident in a storage component having a first access time and that is associated with the mobile device;
- an index containing a plurality of index entries, each of the plurality of index entries comprising one or more search fields that are associated with a data record, a portion of a data record, and a reference to a corresponding portion of the data record stored in the supplemental file, the index being resident in a memory of the mobile device having a second access time that is shorter than the first access time for the storage component of the mobile device;
- an input component for receiving a search query from a user;
- a retrieval component for retrieving one or more index entries that are responsive to the search query by:
  - comparing the search query with at least some of the plurality of index entries to identify the one or more index entries having one or more search fields that are responsive to the search query; and
  - retrieving portions of data records associated with the identified one or more index entries from the index;
- a display component for presenting at least some of the retrieved portions of data records to the user as being responsive to the search query; and
- a second retrieval component for receiving a selection of one of the presented portions of data records, and, in response to receiving a selection of one of the presented portions of data records:
  - retrieving an additional portion of the selected data record from the supplemental file, and
  - presenting the retrieved additional data portion to the user.

28. The system of claim 27, wherein the portions of data records are retrieved from the index and the supplemental file.

29. The system of claim 27, wherein the one or more index entries that are responsive to the search query are identified once, and the corresponding portions of data records associated with the identified one or more index entries are retrieved from the supplemental file a plurality of times.

30. The system of claim 27, wherein the portion of a data record stored in the index is smaller than the portion of the data record stored in the supplemental file.

31. The system of claim 27, wherein the storage component is located remote from the mobile device.

32. The system of claim 27, wherein the storage component is a hard drive.

33. The system of claim 27, wherein the storage component is flash memory.

34. The system of claim 27, wherein the memory is random access memory.

35. The system of claim 27, further comprising automatically ordering the retrieved portions of data records according to one or more presentation rules, and wherein the retrieved portions of data records are presented in an order determined by one or more presentation rules.

\* \* \* \* \*

UNITED STATES PATENT AND TRADEMARK OFFICE
CERTIFICATE OF CORRECTION

| | | |
|---|---|---|
| PATENT NO. | : 8,380,692 B2 | Page 1 of 1 |
| APPLICATION NO. | : 12/019999 | |
| DATED | : February 19, 2013 | |
| INVENTOR(S) | : Mark A. Samuelson | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 177 days.

Signed and Sealed this
Twenty-eighth Day of October, 2014

Michelle K. Lee
*Deputy Director of the United States Patent and Trademark Office*